(12) United States Patent
Paul et al.

(10) Patent No.: US 7,684,592 B2
(45) Date of Patent: Mar. 23, 2010

(54) REALTIME OBJECT TRACKING SYSTEM

(75) Inventors: George V. Paul, Belleville, MI (US);
Glenn J. Beach, Brooklyn, MI (US);
Charles J. Cohen, Ann Arbor, MI (US);
Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 178 days.

(21) Appl. No.: 12/013,717

(22) Filed: Jan. 14, 2008

(65) Prior Publication Data
US 2009/0116692 A1    May 7, 2009

Related U.S. Application Data

(63) Continuation of application No. 09/798,594, filed on Mar. 2, 2001, now abandoned, which is a continuation-in-part of application No. 09/371,460, filed on Aug. 10, 1999, now Pat. No. 6,681,031.

(60) Provisional application No. 60/096,126, filed on Aug. 10, 1998, provisional application No. 60/186,474, filed on Mar. 2, 2000.

(51) Int. Cl.
*G06K 9/00* (2006.01)
(52) U.S. Cl. .................. 382/103; 382/107; 382/164; 382/165; 382/209
(58) Field of Classification Search .......... 382/103, 382/107, 164, 165, 209
See application file for complete search history.

(56) References Cited

U.S. PATENT DOCUMENTS

| | | | |
|---|---|---|---|
| 4,746,770 A | 5/1988 | McAvinney | |
| 5,025,314 A | 6/1991 | Tang et al. | |
| 5,047,952 A | 9/1991 | Kramer et al. | |
| 5,252,951 A | 10/1993 | Tannenbaum et al. | |
| 5,270,820 A | 12/1993 | Fellinger | |

(Continued)

OTHER PUBLICATIONS

Birchfield, S. "Elliptical Head Tracking Using Instensity Gradients and Color Histogram," Proceedings of the IEEE Conference on Computer Vision and Pattern Recognition. Santa Barbara, California, pp. 232-237, Jun. 1998.

(Continued)

*Primary Examiner*—Wesley Tucker
(74) *Attorney, Agent, or Firm*—Gifford, Krass, Sprinkle, Anderson & Citkowski, P.C.

(57) ABSTRACT

A real-time computer vision system tracks one or more objects moving in a scene using a target location technique which does not involve searching. The imaging hardware includes a color camera, frame grabber and processor. The software consists of the low-level image grabbing software and a tracking algorithm. The system tracks objects based on the color, motion and/or shape of the object in the image. A color matching function is used to compute three measures of the target's probable location based on the target color, shape and motion. The method then computes the most probable location of the target using a weighting technique. Once the system is running, a graphical user interface displays the live image from the color camera on the computer screen. The operator can then use the mouse to select a target for tracking. The system will then keep track of the moving target in the scene in real-time.

11 Claims, 4 Drawing Sheets

U.S. PATENT DOCUMENTS

| | | | |
|---|---|---|---|
| 5,423,554 A | 6/1995 | Davis | |
| 5,454,043 A | 9/1995 | Freeman | |
| 5,481,454 A | 1/1996 | Inoue et al. | |
| 5,490,069 A | 2/1996 | Gioutsos et al. | |
| 5,544,050 A | 8/1996 | Abe et al. | |
| 5,563,988 A | 10/1996 | Maes et al. | |
| 5,570,301 A | 10/1996 | Barrus | |
| 5,574,498 A * | 11/1996 | Sakamoto et al. | 348/169 |
| 5,581,276 A | 12/1996 | Cipolla et al. | |
| 5,594,469 A | 1/1997 | Freeman et al. | |
| 5,612,719 A | 3/1997 | Beernink et al. | |
| 5,652,849 A | 7/1997 | Conway et al. | |
| 5,659,764 A | 8/1997 | Sakiyama et al. | |
| 5,668,573 A | 9/1997 | Favot et al. | |
| 5,670,987 A | 9/1997 | Doi et al. | |
| 5,684,701 A | 11/1997 | Breed | |
| 5,696,892 A | 12/1997 | Redmann et al. | |
| 5,699,441 A | 12/1997 | Sagawa et al. | |
| 5,710,833 A | 1/1998 | Moghaddam et al. | |
| 5,714,698 A | 2/1998 | Tokioka et al. | |
| 5,732,227 A | 3/1998 | Kuzunuki et al. | |
| 5,757,360 A | 5/1998 | Nitta et al. | |
| 5,759,044 A | 6/1998 | Redmond | |
| 5,767,842 A | 6/1998 | Korth et al. | |
| 5,774,591 A | 6/1998 | Black et al. | |
| 5,798,758 A | 8/1998 | Harada et al. | |
| 5,801,704 A | 9/1998 | Oohara et al. | |
| 5,802,220 A | 9/1998 | Black et al. | |
| 5,813,406 A | 9/1998 | Kramer et al. | |
| 5,828,779 A | 10/1998 | Maggioni et al. | |
| 5,838,365 A | 11/1998 | Sawasaki et al. | |
| 5,864,808 A | 1/1999 | Ando et al. | |
| 5,864,848 A | 1/1999 | Horvitz et al. | |
| 5,875,257 A | 2/1999 | Marrin et al. | |
| 5,878,151 A | 3/1999 | Tang et al. | |
| 5,880,411 A | 3/1999 | Gillespie et al. | |
| 5,887,069 A | 3/1999 | Sakou et al. | |
| 5,889,236 A | 3/1999 | Gillespie et al. | |
| 5,889,523 A | 3/1999 | Wilcox et al. | |
| 5,898,434 A | 4/1999 | Small et al. | |
| 5,901,246 A | 5/1999 | Hoffberg et al. | |
| 5,903,229 A | 5/1999 | Kishi et al. | |
| 5,907,328 A | 5/1999 | Brush, II et al. | |
| 5,907,852 A | 5/1999 | Yamada et al. | |
| 5,912,980 A * | 6/1999 | Hunke | 382/103 |
| 5,917,490 A | 6/1999 | Kuzunuki et al. | |
| 5,966,129 A | 10/1999 | Matsukuma et al. | |
| 5,973,732 A | 10/1999 | Guthrie | |
| 5,990,865 A | 11/1999 | Gard | |
| 6,002,428 A | 12/1999 | Matsumura et al. | |
| 6,002,808 A | 12/1999 | Freeman | |
| 6,005,549 A | 12/1999 | Forest | |
| 6,009,210 A | 12/1999 | Kang | |
| 6,014,167 A | 1/2000 | Suito et al. | |
| 6,031,568 A | 2/2000 | Wakitani | |
| 6,035,053 A | 3/2000 | Yoshioka et al. | |
| 6,035,067 A | 3/2000 | Ponticos et al. | |
| 6,061,055 A | 5/2000 | Marks | |
| 6,066,954 A | 5/2000 | Gershenfeld et al. | |
| 6,075,557 A | 6/2000 | Holliman et al. | |
| 6,075,895 A | 6/2000 | Qiao et al. | |
| 6,082,764 A | 7/2000 | Seki et al. | |
| 6,088,017 A | 7/2000 | Tremblay et al. | |
| 6,088,019 A | 7/2000 | Rosenberg | |
| 6,104,383 A | 8/2000 | Shipman | |
| 6,130,964 A | 10/2000 | Marques et al. | |
| 6,137,908 A | 10/2000 | Rhee | |
| 6,144,366 A | 11/2000 | Numazaki et al. | |
| 6,154,559 A | 11/2000 | Beardsley | |
| 6,163,336 A | 12/2000 | Richards et al. | |
| 6,173,066 B1 | 1/2001 | Peurach et al. | |
| 6,185,314 B1 * | 2/2001 | Crabtree et al. | 382/103 |
| 6,188,777 B1 | 2/2001 | Darrell et al. | |
| 6,219,032 B1 | 4/2001 | Rosenberg et al. | |
| 6,236,736 B1 * | 5/2001 | Crabtree et al. | 382/103 |
| 6,263,088 B1 * | 7/2001 | Crabtree et al. | 382/103 |
| 6,272,231 B1 | 8/2001 | Maurer et al. | |
| 6,275,213 B1 | 8/2001 | Tremblay et al. | |
| 6,298,170 B1 | 10/2001 | Morita et al. | |
| 6,301,370 B1 | 10/2001 | Steffens et al. | |
| 6,335,977 B1 | 1/2002 | Kage et al. | |
| 6,353,427 B1 | 3/2002 | Rosenberg | |
| 6,456,728 B1 | 9/2002 | Doi et al. | |
| 6,529,809 B1 | 3/2003 | Breed et al. | |
| 6,545,670 B1 | 4/2003 | Pryor et al. | |
| 6,720,949 B1 | 4/2004 | Pryor et al. | |
| 6,766,036 B1 | 7/2004 | Pryor et al. | |
| 6,804,396 B2 | 10/2004 | Higaki et al. | |
| 7,050,606 B2 | 5/2006 | Paul et al. | |
| 7,460,690 B2 | 12/2008 | Cohen et al. | |
| 2001/0008561 A1 | 7/2001 | Paul et al. | |
| 2001/0029416 A1 | 10/2001 | Breed et al. | |
| 2002/0029103 A1 | 3/2002 | Breed et al. | |
| 2002/0036617 A1 | 3/2002 | Pryor | |
| 2002/0097223 A1 | 7/2002 | Rosenberg | |
| 2003/0125855 A1 | 7/2003 | Breed et al. | |
| 2003/0209893 A1 | 11/2003 | Breed et al. | |
| 2005/0008193 A1 | 1/2005 | Toyama | |

OTHER PUBLICATIONS

Horn, B.K.P. "Robot Vision," The MIT Press, Cambridge, Massachusetts, 1986.

US. Air force Instruction, "Aircraft Cockpit and Formation Flight Signals," May 1994.

U.S. Army Field Manual No. 21-60, Washington, D.C., Sep. 30, 1987.

Arnold, V.L., "Ordinary Differential Equations," MIT Press, 1978.

Cohen, C., "Dynamical System Representation, Generation and Recognition of Basic Oscillatory Motion Gestures and Applications for the Control of Actuated Mechanisms," Ph.D. Dissertation, Univ. of Michigan, 1996.

Frank, D., "HUD Expands Kiosk Program," Federal Computer Week, Mar. 8, 1999.

Hager, G., Chang, W., Morse, A.; "Robot Feedback Control Based on Stereo Vision: Towards Calibration-Free Hand-Eye Coordination," IEEE Int. Conf. Robotics and Automation, San Diego, CA, May 1994.

Hauptmann, A., "Speech and Gestures for Graphic Image Manipulation," Computer Human Interaction 1989 Proc., pp. 241-245, May 1989.

Hirsch, M. Smale, S., "Differential Equations, Dynamical Systems and Linear Algebra," Academic Press, Orlando, FL, 1974.

Kanade, T., "Computer Recognition of Human Faces," Birkhauser Verlag, Basel and Stuttgart, 1977.

Karon, P., "Beating an Electronic Pathway to Government with Online Kiosks," Los Angeles Times, Aug. 25, 1996.

Link-Belt Construction Equipment Co., "Operating Safety: Crames & Excavators," 1987.

Turk, M., Pentland, A, "Eigenfaces for Recognition," Journal of Cognitive Neuroscience, 3, 1, 71-86, 1991.

Narendra, K. Baiakrishnan, J. "Improving Transient Response to Adaptive. Control Systems Using Multiple Models and Switching," IEEE Trans. on Automatic Control, 39:1861-1866, Sep. 1994.

Rizzi, A., Whitecomb, L., Koditschek, D.; "Distributed Real-Time Control of a Spatial Robot Juggler," IEEE Computer, 25(5) May 1992.

Wolf, C., Morrel-Samuels, P., "The use of hand-drawn gesetures for text editing," Int. Journ. of Man-Machine Studies, vol. 27, pp. 91-102, 1987.

Wolf, C., Rhyne, J., "A Taxonomic Approach to Understanding Direct Manipulation," Jour. of the Human Factors Society 31th Annual Meeting, pp. 576-580, 1987.

Yuille, A., "Deformable Templates for Face Recognition," Journ. of Cognitive Neuroscience, 3, 1, 59-70, 1991.

C. Cohen, G. Beach, G. Paul, J. Obermark, G. Foulk, "Issues of Controlling Public Kiosks and other Self Service Machines using Gesture Recognition," Oct. 1998.

L. Conway, C. Cohen, "Video Mirroring and Iconic Gestures: Enhancing Basic Videophones to Provide Visual Coaching and Visual Control", (Publication date unknown; believed to have been published prior to the priority date of the instant application).

C. Cohen, L. Conway, D. Koditschek, G. Roston, "Dynamic System Representation of Basic and Non-Linear in Parameters Oscillatory Motion Gestures," Oct. 1997.

C. Cohen, L. Conway, D. Koditschek, "Dynamic System Representation, Generation, and Recognition of Basic Oscillatory Motion Gestures," Oct. 1996.

C. Cohen, G. Beach, B. Cavell, G. Foulk, J. Obermark, G. Paul, "The Control of Self Service Machines Using Gesture Recognition," (Aug. 1999).

Wren et al., Pfinder: Real-Time Tracking of the Human Body, IEEE Transactions on Pattern Analysis and Machine Intelligence, 19(7): 780-785, Jul. 1997.

\* cited by examiner

```
Given new image and the estimated target center as rc, cc and old target shape
begin
    for i=rc-rs/2 to i=rc+rs/2
        for j=cc-cs/2 to j=cc+cs/2
            RGB = pixel(i,j)
            c = FindColorMatch(RGB)
            if c>0
                cr = c*i
                cc = c*j
                if this pixel lies on the previous shape template
                    sr = c*i
                    sc = c*j
                    s = c;
                else pixel shows movement
                    mr = c*i
                    mc = c*j
                    m = c;
                endif
                mark this pixel in the next shape template
                Nc = Nc+c
                Ns = Ns+s
                Nm = Nm+m
            else
                unmark this pixel in the next shape template
            endif
        endfor
    endfor cr = cr/Nc, cc = cc/Nc
    sr = or/Ns, sc = sc/Ns
    mr = mr/Nm, mc = mc/Nm compute new target center as a weighted average
    newr = cr*cw + sr*sw + mr*mw
    newc = cc*cw + sc*sw + mc*mw
    velr = (newr-rc)/t
    velc = (newc-cc)/t
```

FIGURE 6

REALTIME OBJECT TRACKING SYSTEM

REFERENCE TO PRIOR APPLICATIONS

This application is a continuation of U.S. patent application Ser. No. 09/798,594, filed Mar. 2, 2001 now abandoned, which claims priority of U.S. provisional application Ser. No. 60/186,474, filed Mar. 2, 2000. U.S. patent application Ser. No. 09/798,594 is a continuation-in-part of U.S. patent application Ser. No. 09/371,460, filed Aug. 10, 1999, now U.S. Pat. No. 6,681,031. U.S. patent application Ser. No. 09/371,460 claims priority from U.S. provisional application Ser. No. 60/096,126, filed Aug. 10, 1998. The entire content of each application is incorporated herein by reference.

FIELD OF THE INVENTION

This invention relates generally to computer vision systems and, in particular, to a real-time object tracking system and method color involving a color matching technique requiring minimal computation.

BACKGROUND OF THE INVENTION

Current imaging systems can convert live scenes into a sequence of digital images which can be processed to track any object in the scene from frame to frame. The techniques used for tracking are numerous. Most of the currently available systems use some characteristic of the subset of the image containing the target to search and locate the target in the following image. The quality and speed of the tracking system depends on the implementation of this search and locate idea.

Most tracking systems use correlation of a sample subimage representing the object with parts of the current image. The correlation values are computed in a search area around an estimated location of the object. The correlation operation is computationally expensive and usually is performed using specialized hardware.

Another set of tracking methods uses a 3D model of the object being tracked. In these methods, the model is mapped into the target location based on the location and illumination parameters. The disadvantage of such model based tracking methods is the relatively high amount of computation for the mapping from the 3D model to the image. The tracking systems that avoid the correlation or model matching approaches, use characteristics of the object's appearance or motion in estimating the location of the object in the current image. These techniques are faster than correlation methods but are less robust to changing shape and temporary occlusion by similarly colored objects in the scene.

The work by Darell et al. in U.S. Pat. No. 6,188,777 uses stereo cameras and involves three modules which compute the range of the tracked object, segments the object based on color and does pattern classification. Each of the modules involved places a large computational load on the computer. The method of Peurach et. al. in U.S. Pat. No. 6,173,066 uses a 3D object model database and projection geometry to find the pose of the object in the 2D camera image. The pose determination and tracking involves searching in a multi-dimensional object pose space. The computation involved is very high.

The method of Richards in U.S. Pat. No. 6,163,336 uses special cameras and infrared lighting and a specialized background. The method of Marques et. al. in U.S. Pat. No. 6,130,964 involves a layered segmentation of the object in the scene based on a homogenuity measure. The method also involves a high amount of computation. The template matching method proposed by Holliman et. al. in U.S. Pat. No. 6,075,557 which tracks subimages in the larger camera image involves search and correlation means relatively large amounts of computation. The method of Ponticos in U.S. Pat. No. 6,035,067 uses segmentation of the image based on pixel color. The system of Wakitani in U.S. Pat. No. 6,031,568 uses hardware to do template matching of the target. The method is computationally expensive correlation is done via hardware.

The tracking proposed in this method by Suito et. al. in U.S. Pat. No. 6,014,167 relies mostly on the difference image between successive frames to detect motion and then tracks moving pixels using color. This work uses correlation and searches in a multi dimensional space to compute the object's 3D position and orientation. The amount of computation involved is immense.

The proposed method of Matsumura et. al. in U.S. Pat. No. 6,002,428 does color matching to track the target. The method of Guthrie in U.S. Pat. No. 5,973,732 uses differencing and blob analysis. The method of Hunke in U.S. Pat. No. 5,912,980 uses color matching as opposed to shape. The method of Tang et. al in U.S. Pat. No. 5,878,151 uses correlation to track subimages in the image.

SUMMARY OF THE INVENTION

This invention resides in a real-time computer vision system capable of tracking moving objects in a scene. Unlike current search and locate algorithms, the subject algorithm uses a target location technique which does not involve search. The system tracks objects based on the color, motion and shape of the object in the image. The tracking algorithm uses a unique color matching technique which uses minimal computation. This color matching function is used to compute three measures of the target's probable location based on the target color, shape and motion. It then computes the most probable location of the target using a weighting technique. These techniques make the invention very computationally efficient also makes it robust to noise, occlusion and rapid motion of the target.

The imaging hardware of the real-time object tracking system includes a color camera, a frame grabber, and a personal computer. The software includes low-level image grabbing software and the tracking algorithm. Once the application is running, a graphical user interface displays the live image from the color camera on the computer screen. The operator can then use the mouse to click on the hand in the image to select a target for tracking. The system will then keep track of the moving target in the scene in real-time.

BRIEF DESCRIPTION OF THE DRAWINGS

FIG. 6 illustrates steps of a method according to the invention written in pseudocode.

DETAILED DESCRIPTION OF THE INVENTION

Figure 1:
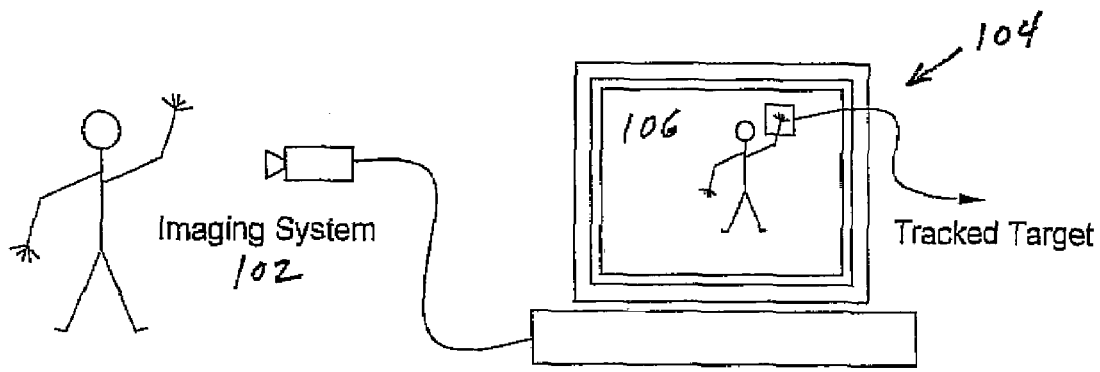
FIG. 1 is a simplified drawing of an imaging system and computer with tracking algorithm according to the invention.

A schematic of the system is shown in FIG. 1. The imaging hardware includes a color camera 102 and a digitizer. The sequence of images of the scene is then fed to a computer 104 which runs tracking software according to the invention. The tracking algorithm is independent of the imaging system hardware. The tracking system has a graphical user interface (GUI) to initialize the target and show the tracking result on the screen 106.

The GUI for the ROTS displays a live color image from the camera on the computer screen. The user can initialize the target manually or automatically. Once initialized, the ROTS will then track the target in real-time.

Figure 2:
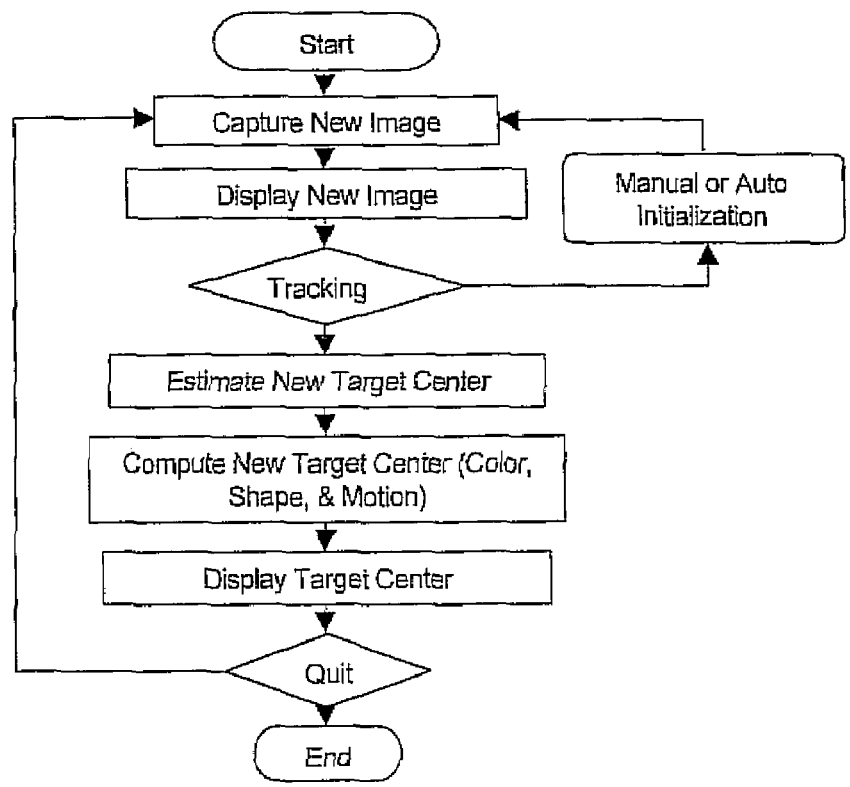
FIG. 2 is a flow chart illustrating important steps of the tracking algorithm.

The flow chart of the tracking algorithm is shown in FIG. 2. The program captures live images from the camera and displays them on the screen. It then allows the user to select the target manually using the mouse or automatically by moving the target to a predetermined position in the scene. At the point of initialization, the color, the shape and location of the target are computed and stored. Once the target is initialized, we compute an estimate of the target location using target dynamics. We then compute the actual location using the color, shape and motion information with respect to a region centered at the estimated location.

Figure 3:
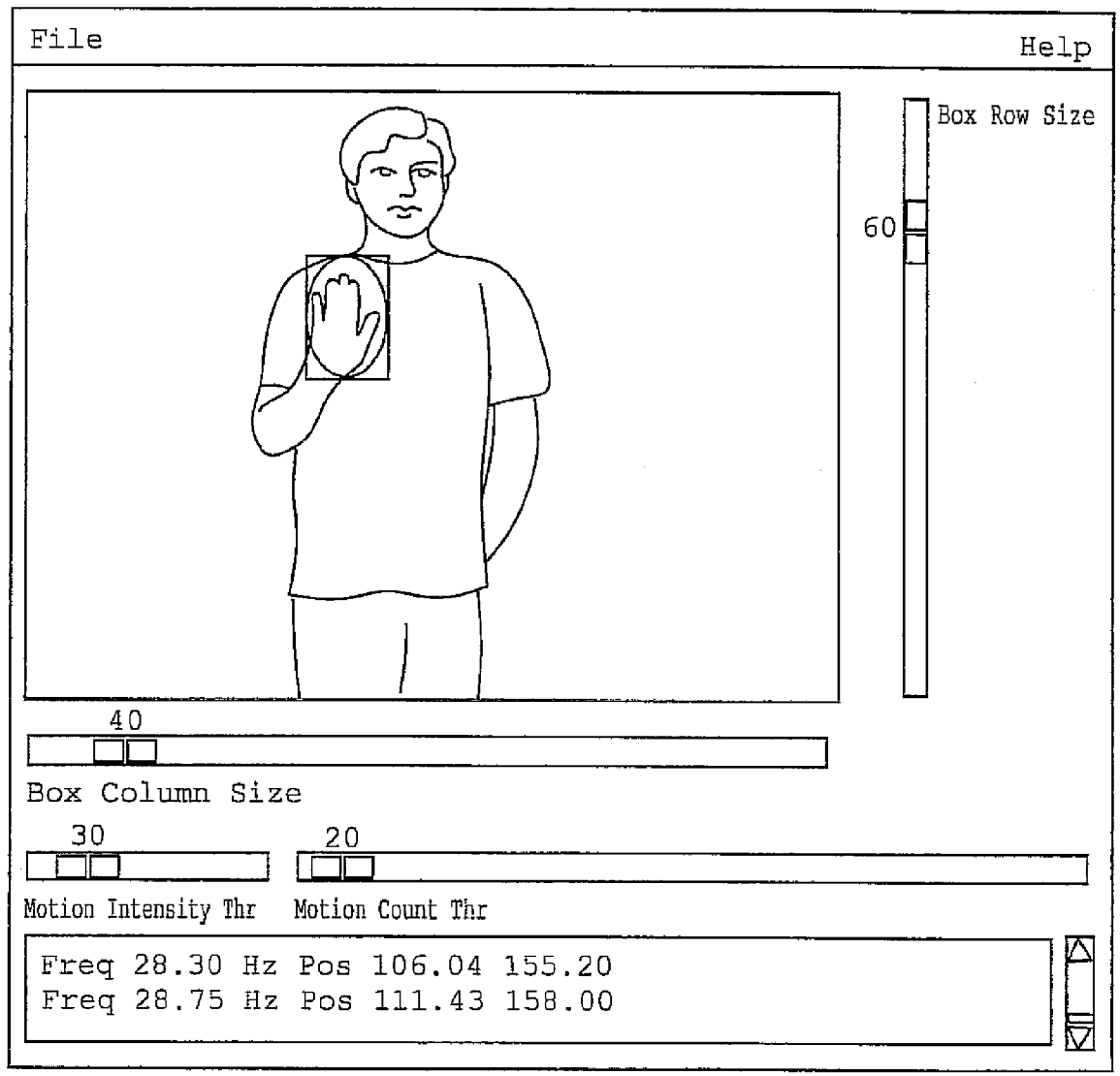
FIG. 3 is a drawing of a preferred graphical user interface for use with the system of the invention.
Figure 4:
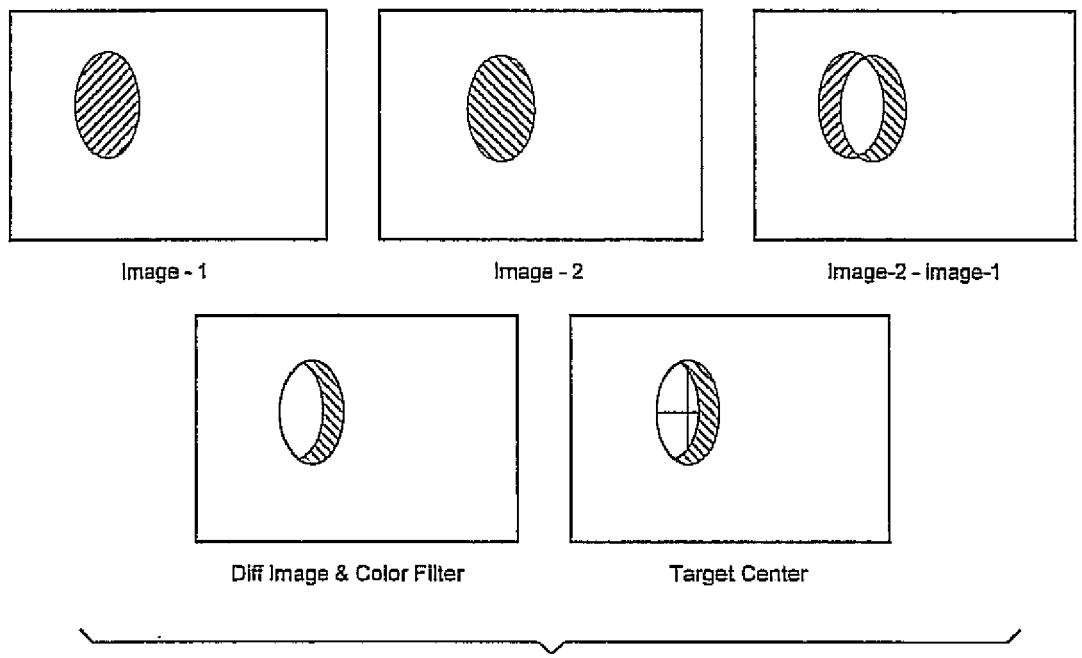
FIG. 4 is a series of drawings which show the use of color to track a target or feature.

The input to the ROTS is a sequence of color images, preferably in the standard RGB24 format. Hence, the hardware can be a camera with an image grabbing board or a USB camera connected to the USB port of the computer. A preferred GUI is shown in FIG. 3. FIG. 4 shows a series of drawings which show the use of color to track a target or feature.

Tracking Using Color, Shape and Motion

Once the user clicks on the target in the image, we compute the median color of a small region around this point in the image. This will be the color of the target region being tracked in the scene until it is reinitialized. We also store the shape of the target by segmenting the object using its color. Once tracking begins, we compute the center of the target region in the image using a combination of three aspects of the target. The three aspects are the color, the shape and the motion. This results in a very robust tracking system which can withstand a variety of noise, occlusion and rapid motion.

Color Matching

The color of a pixel in a color image is determined by the values of the Red, Green and Blue bytes corresponding to the pixel in the image buffer. This color value will form a point in the three-dimensional RGB color space. When we compute the color of the target, we assume that the target is fairly evenly colored and the illumination stays relatively the same. The color of the target is then the median RGB value of a sample set of pixels constituting the target. When the target moves and the illumination changes the color of the target is likely to change. We use a computationally efficient color matching function which allows us to compute whether a pixel color matches the target color within limits.

Figure 5:
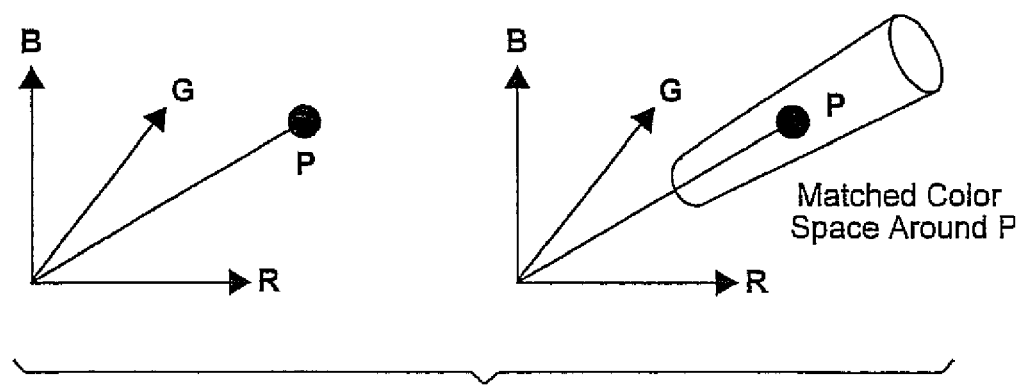
FIG. 5 illustrates the use a truncated cone to account for slight variations in color.

When the illumination on the target changes, the intensity of the color will change. This will appear as a movement along the RGB color vector as shown in FIG. 5. In order to account for slight variations in the color, we further allow the point in color space to lie within a small-truncated cone as shown in FIG. 5. The two thresholds will decide the shape of the matching color cone. A threshold on the angle of the color cone and another threshold on the minimum length of the color vector decides the matching color space. Thus, any pixel whose color lies within the truncated cone in color space will be considered as having the same color as the target.

Given a colored pixel, we quantitatively define the match between it and a reference color pixel as follows. Let (R, G, B) be the values of the RGB vector of the first pixel. Let $(R_r, G_r, B_r)$ be the RGB vector for the reference color.

$$d = RR_r + GG_r + BB_r$$
$$m_r = R_r^2 + G_r^2 + B_r^2$$
$$m = R^2 + G^2 + B^2$$
$$d_m = \frac{d}{m_r}$$
$$d_a = \frac{d}{\sqrt{m_r m}}$$
$$ColorMatch(R, G, B) = \begin{cases} d_m d_a & \text{if } ((d_m^l < d_m < d_m^h) \& (d_a^l < d_a < d_a^h)) \\ 0 & \text{otherwise} \end{cases}$$

The value of $d_m$ is related to the length of the projection of the given color vector onto the reference vector. The value of $d_a$ is related to the angle between the two vectors. If we set two threshold bands for $d_m$ and $d_a$, we can filter out those pixels which lie within the truncated cone around the reference vector. Their product will indicate the goodness of the match. The parameters $d_m$ and $d_a$ are chosen to be computationally simple to implement which becomes important when all the pixels in a region have to be compared to the reference color in each new image.

Position Using Color

Once we have the target color and a color matching algorithm, we can find all the pixels in any given region of the image which match the target color. We use the quantitative measure of the match to find a weighted average of these pixel positions. This gives us the most likely center of the target based on color alone. If (i, j) are the row and column coordinates of the pixel $P_c(i,j)$, then for a given rectangular region the most likely target center based on color alone will be given as follows.

$$P_c(i, j, t) = ColorMatch(R(i, j, t), G(i, j, t), B(i, j, t))$$

$$Center_{color} = \begin{bmatrix} r_c \\ c_c \end{bmatrix} = \begin{bmatrix} \dfrac{\sum_1^{I*J} P_c(i, j, t) * i}{\sum_1^{I*J} P_c(i, j, t)} \\ \dfrac{\sum_1^{I*J} P_c(i, j, t) * j}{\sum_1^{I*J} P_c(i, j, t)} \end{bmatrix}$$

Note that the centroid of the target is computed as a weighted sum. The weights are the color matching measure of the pixel. This weighting of the pixel contrasts with the usual practice of weighting all matching pixels the same makes our algorithm less prone to creep. We also keep track of the sum of the matched pixel weights. If this sum is less than a threshold we assume that the target is not in the region.

Shape Matching

Once the target is initialized, we compute a two-dimensional template of the target. We use this dynamic template which is updated every frame to measure the closeness of pixels at the estimated location to the target shape. Given the color of the object being tracked and the color matching function we segment all the pixels in a region around the estimated location. The resulting segmented image is the shape of the object and forms the template. With each new image of the scene, the template of the target in the previous frame is used to compute the new center of the target in the new image. The advantage of using templates instead of any assumed shape such as an ellipse is that the tracking and localization of the target is much more robust to shape change and hence more accurate.

$$P(i, j, t) = \text{ColorMatch}(R(i, j, t), G(i, j, t), B(i, j, t)) \text{ for time} = t$$

$$M(i, j, t-1) = \begin{cases} 1 & \text{if } (P(i, j, t-1) > 0) \\ 0 & \text{otherwise} \end{cases}$$

$$S(i, j, t) = P(i, j, t) M(i, j, t-1)$$

$$\text{Center}_{shape} = \begin{bmatrix} r_s \\ c_s \end{bmatrix} = \begin{bmatrix} \dfrac{\sum_{1}^{I*J} S(i, j, t) * i}{\sum_{1}^{I*J} S(i, j, t)} \\ \dfrac{\sum_{1}^{I*J} S(i, j, t) * j}{\sum_{1}^{I*J} S(i, j, t)} \end{bmatrix}$$

The closeness of the shape is a summation of the product of the pixel color match $P(i, j)$ with the target template $M(i, j)$. Note again that the color matching measure is used to weight the shape measure. This makes our algorithm robust to creep. Once the region S is obtained, we can compute the centroid of S. This is the probable location of the target based solely on the shape of the target.

Motion Detection

The algorithm checks for motion in a region near the estimated target position using a motion detecting function. This function computes the difference between the current image and the previous image, which is stored in memory. If motion has occurred, there will be sufficient change in the intensities in the region. The motion detection function will trigger if a sufficient number of pixels change intensity by a certain threshold value. This detection phase eliminates unnecessary computation when the object is stationary.

Position Using Motion

If the motion detection function detects motion, the next step is to locate the target. This is done using the difference image and the target color. When an object moves between frames in a relatively stationary background, the color of the pixels changes between frames near the target (unless the target and the background are of the same color). We compute the color change between frames for pixels near the target location. The pixels whose color changes beyond a threshold make up the difference image. Note that the difference image will have areas, which are complementary. The pixels where the object used to be will complement those pixels where the object is at now. If we separate these pixels using the color of the target, we can compute the new location of the target. The set of pixels in the difference image, which has the color of the target in the new image, will correspond to the leading edge of the target in the new image. If we assume that the shape of the target changes negligibly between frames, we can use the shape of the target from the previous image to compute the position of the center of the target from this difference image.

Let D be the difference sub-image between the previous target and the estimated target location in the new image. If we threshold the difference image, we end up with a binary image. If we intersect this binary image D with the shape of the target in the new image M we get the moving edge of the target as the region V. We then weight this region by the color matching measure P.

$$D(i, j, t) = \begin{cases} 1 & \text{if } |P(i, j, t) - P(i, j, t-1)| > \tau_m \\ 0 & \text{otherwise} \end{cases}$$

$$M(i, j, t) = \begin{cases} 1 & \text{if } (P(i, j, t) > \tau_c) \\ 0 & \text{otherwise} \end{cases}$$

$$V(i, j, t) = (D(i, j, t) \cap M(i, j, t)) * P(i, j, t)$$

$$\text{Center}_{motion} = \begin{bmatrix} r_m \\ c_m \end{bmatrix} = \begin{bmatrix} \dfrac{\sum_{1}^{I*J} V(i, j, t) * i}{\sum_{1}^{I*J} V(i, j, t)} \\ \dfrac{\sum_{1}^{I*J} V(i, j, t) * j}{\sum_{1}^{I*J} V(i, j, t)} \end{bmatrix}$$

The centroid of the region V is then computed as the probable location of the target based on motion alone. This weighting of the intersection region by the color matching measure makes our tracking less prone to jitter.

In a physically implemented system, the image capture board is capable of providing us with a 480×640-pixel color image at 30 frames per second. Processing such a large image will slow down the program. Fortunately, the nature of the tracking task is such that, only a fraction of the image is of interest. This region called the window of interest lies around the estimated position of the target in the new image. We can compute the location of the target in the new image from the location of the target in the previous image and its dynamics. We have used prediction based on velocity computation between frames. This technique is able to keep track of the target even when the target moves rapidly. We have found that the window of interest is typically one one-hundredth the area of the original image. This speeds up the computation of the new target location considerably.

Tracking Algorithm

If we are given an estimated target location as (rc, cc) in the new image and the size of the area to be searched is given by (rs, cs), then the algorithm can be written in pseudo code as shown in FIG. 6.

Note that the color matching weight c is being used to weight all the three centers. This weighting makes this algorithm smoother and more robust. The velocity computed at the end of the tracking algorithm is used to compute the estimated position of the target in the next frame.

Extensions of the system are possible in accordance with the described algorithm herein. One is a tracking system which can track multiple targets in the same image. Another uses the tracking in two stereo images to track the target in 3D.

We claim:

1. A method of tracking a target, comprising the steps of:
   inputting a sequence of images representative of a scene;
   selecting a target in the scene;
   computing with a processor the median color of a region around the selected target, and storing this as the color of the target;
   computing a two-dimensional template of the target based upon the color of the target, and storing this template as the shape of the target;
   computing the center of the target based upon its shape;
   a) comparing the center of the target to the center of the target in the previous image of the sequence to determine the motion of the target, if any;
   b) determining the probable new location of the target based upon the target color, shape and motion;
   c) using a weighing technique to determine the most probable new location of the target; and
   d) tracking the target by repeating steps a)-c) for each new image in the sequence of images.

2. The method of claim 1, wherein the step of selecting a target in the scene includes the step of user-selecting the target on a computer screen through a graphical user interface.

3. The method of claim 2, wherein the graphical user interface provides a bounding box surrounding the target superimposed on each image as it is displayed on the screen.

4. The method of claim 1, further including the step of enabling a match between the color of the target in the subsequent image to the color of the target in a previous image despite differences arising from target lighting and shadows.

5. The method of claim 1, further including the step of enabling a match between the color of the target in the subsequent image to the color of the target in a previous image within a threshold of hue.

6. The method of claim 1, wherein step of comparing the center of the target in the subsequent image to the center of the target in the initial image includes a comparison of pixels in an RGB format.

7. The method of claim 1, further including the step of determining if the target has moved outside of the scene.

8. The method of claim 1, further including the step of finding a weighted average of color to compute the center of the target based upon color alone.

9. The method of claim 1, wherein the step of computing a two-dimensional template of the target is done through segmenting a region defined by a predetermined closeness of color as an estimate of target shape.

10. The method of claim 1, further including the step of continuing to track the target when the target moves in front of or behind a similarly colored object in the scene.

11. The method of claim 1, further including the step of continuing to track the target when the target and input image move in relation to one another.

* * * * *